(12) United States Patent
Shim et al.

(10) Patent No.: US 6,791,919 B2
(45) Date of Patent: Sep. 14, 2004

(54) SELECTIVE DISTURBANCE COMPENSATING APPARATUS USED IN REPRODUCTION FROM OPTICAL RECORDING MEDIUM AND 3T-CORRECTING METHOD

(75) Inventors: Jae-seong Shim, Seoul (KR); Ki-hyun Kim, Seoul (KR); Hyun-soo Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 482 days.

(21) Appl. No.: 09/961,331

(22) Filed: Sep. 25, 2001

(65) Prior Publication Data

US 2002/0060596 A1 May 23, 2002

(30) Foreign Application Priority Data

Sep. 25, 2000 (KR) .......................................... 2000-56149

(51) Int. Cl.$^7$ ................................................. G11B 7/00
(52) U.S. Cl. .................. 369/47.1; 369/59.22; 369/47.18
(58) Field of Search .............................. 369/47.1, 47.17, 369/47.18, 53.32, 59.21, 59.22, 124.05, 124.15

(56) References Cited

U.S. PATENT DOCUMENTS 5,986,592 A * 11/1999 Nakagawa et al. ........... 341/94

* cited by examiner

Primary Examiner—Nabil Hindi
(74) Attorney, Agent, or Firm—Staas & Halsey LLP

(57) ABSTRACT

A selective disturbance compensating apparatus for use in reproduction from an optical recording medium, and a 3T-correcting method. A DC offset canceller extracts a DC offset from a reproduction signal to cancel the DC offset. An equalizer equalizes the offset-cancelled signal. A switching unit selects between the offset-canceled signal and the equalized signal according to whether distortion caused by asymmetry of the signal is above or below a predetermined reference level. A 3-T correcting unit corrects asymmetry of the selected signal. In another embodiment, a second switching unit selects between the 3-T corrected signal and a Viterbi corrected signal.

26 Claims, 13 Drawing Sheets

FIG. 4

| LOGIC CONDITIONS OF LEVEL DETECTOR | SEL1 | SEL2 | Detected Value | Level_Ena |
|---|---|---|---|---|
| $y_k[t+n-2] * y_k[t+n-1] \leq 0$ AND $|y_k[t+n-2]| \leq |y_k[t+n-1]|$ AND $y_k[t+n-1] > 0$ | 0 | 1 | $y_k[t+n-1]$ | +Mid Level |
| $y_k[t+n-2] * y_k[t+n-1] \leq 0$ AND $|y_k[t+n-2]| \leq |y_k[t+n-1]|$ AND $y_k[t+n-1] \leq 0$ | 1 | 1 | $y_k[t+n-3]$ | -Mid Level |
| $y_k[t+n-2] * y_k[t+n-1] \leq 0$ AND $|y_k[t+n-2]| \leq |y_k[t+n-1]|$ AND $y_k[t+n-1] > 0$ | 0 | 1 | $y_k[t+n-1]$ | +Mid Level |
| $y_k[t+n-2] * y_k[t+n-1] \leq 0$ AND $|y_k[t+n-2]| \leq |y_k[t+n-1]|$ AND $y_k[t+n-1] \leq 0$ | 1 | 1 | $y_k[t+n-3]$ | -Mid Level |
| $y_k[t+n-2] * y_k[t+n-1] \leq 0$ AND $|y_k[t+n-2]| > |y_k[t+n-1]|$ AND $y_k[t+n-1] > 0$ | 1 | 0 | $y_k[t+n-2]$ | +Mid Level |
| $y_k[t+n-2] * y_k[t+n-1] \leq 0$ AND $|y_k[t+n-2]| > |y_k[t+n-1]|$ AND $y_k[t+n-1] \leq 0$ | 0 | 0 | $y_k[t+n]$ | -Mid Level |
| $y_k[t+n-2] * y_k[t+n-1] \leq 0$ AND $|y_k[t+n-2]| > |y_k[t+n-1]|$ AND $y_k[t+n-1] > 0$ | 0 | 0 | $y_k[t+n]$ | +Mid Level |
| $y_k[t+n-2] * y_k[t+n-1] \leq 0$ AND $|y_k[t+n-2]| > |y_k[t+n-1]|$ AND $y_k[t+n-1] \leq 0$ | 1 | 0 | $y_k[t+n-2]$ | -Mid Level |
| $y_k[t+n-2] > Th$, $y_k[t+n-1] > Th$, AND $y_k[t+n] > Th$ | 0 | 1 | $y_k[t+n-1]$ | +Max Level |
| $y_k[t+n-2] < Th$, $y_k[t+n-1] < Th$, AND $y_k[t+n] < Th$ | 0 | 1 | $y_k[t+n-1]$ | -Max Level |
| $y_k[t+n-1] * y_k[t+n] \leq 0$ AND $|y_k[t+n-1]| \leq |y_k[t+n]|$ | 0 | 0 | $y_k[t+n]$ | Zero Level |
| $y_k[t+n-1] * y_k[t+n] \leq 0$ AND $|y_k[t+n-1]| > |y_k[t+n]|$ | 0 | 0 | $y_k[t+n]$ | Zero Level |

SELECTIVE DISTURBANCE COMPENSATING APPARATUS USED IN REPRODUCTION FROM OPTICAL RECORDING MEDIUM AND 3T-CORRECTING METHOD

CROSS REFERENCE TO RELATED APPLICATIONS

This application claims the benefit of Korean Application No. 2000-56149 filed Sep. 25, 2000 in the Korean Patent Office, the disclosure of which is incorporated herein by reference.

BACKGROUND OF THE INVENTION

1. Field of the Invention

The present invention relates to an apparatus for and a method of selective disturbance compensating a signal reproduced from an optical recording medium, and more particularly, to a selective disturbance compensating apparatus and a 3T-correcting method, in which tilt or asymmetry which occurs in the reproduced signal is compensated by selectively using an equalizer or T-correcting circuit.

2. Description of the Related Art

An example of a conventional disturbance compensating circuit for an optical recording medium is shown in FIG. 1. The disturbance compensating circuit includes an analog-to-digital converter (ADC) 100, a direct current (DC) offset canceller 110, an adder 120, an adaptive equalizer 130, a Viterbi decoder 140, and a phase-locked loop circuit (PLC) 150. The ADC 100 converts an analog signal read from the optical recording medium to digital data with a predetermined sampling cycle. The DC offset canceller 110 extracts a DC offset from the digital data output from the ADC 100. The adder 120 adds the digital data output from the ADC 100 with a negative DC offset signal output from the DC offset canceller 110 to output digital data from which the DC offset is removed. The adaptive equalizer 130, which is for compensating for an error existing in the DC offset-canceled digital data, compensates for tilt of the optical recording medium, like a general error correcting apparatus used in, for example, a hard disk drive (HDD). The Viterbi decoder 140 compensates for an asymmetry component of the signal output from the adaptive equalizer 130. The above-described structure is a typical partial response maximum likelihood (PRML) detection structure. A phase-locked signal generated by the phase-locked circuit 150 is used as a clock of this circuit.

Since the conventional disturbance compensating circuit adopts high-performance detectors such as the adaptive equalizer 130 and Viterbi decoder 140, its overall detection performance, particularly with respect to a tangential tilt, is excellent. However, there is a problem of degrading of the adaptive PRML detection performance of the adaptive equalizer 130 where serious asymmetry occurs. In addition, there is a problem in that the circuit becomes large.

SUMMARY OF THE INVENTION

To solve the above-described problems, it is an object of the present invention to provide a selective disturbance compensating apparatus for reproduction from an optical recording medium and a method of 3T-correcting, in which detection performance with respect to tilt and asymmetry is improved by selectively using an equalizer and a T-correcting circuit. Additional objects and advantages of the invention will be set forth in part in the description which follows, and, in part, will be obvious from the description, or may be learned by practice of the invention.

To achieve the above and other objects of the present invention, there is provided a selective disturbance compensating apparatus for use in reproduction from an optical recording medium for compensating for the disturbance of a signal read from the reproducing medium and converted into a digital signal. A direct current (DC) offset canceller extracts a DC offset from the signal and cancels the DC offset. A switching unit performs an appropriate switching operation according to whether distortion caused by asymmetry of the offset-canceled signal is above a predetermined reference level. A first signal processor is selected by the switching unit where the distortion caused by asymmetry of the offset-canceled signal is below the predetermined reference level to equalize the offset-cancelled signal. A second signal processor receives the offset-canceled signal to correct the asymmetry of the received signal where the distortion caused by asymmetry of the signal is above the predetermined reference level, and receives the signal output from the first signal processor where the first signal process is selected by the switching unit to correct the asymmetry of the signal from the first signal processor.

Preferably, the first signal processor compares a predetermined expected value with an actual detected value and compensates for a difference (error) between the compared signals so that the difference converges to zero.

Preferably, the first signal processor is an equalizer. In the equalizer, an adaptive filter filters the offset-canceled signal with a variable tap coefficient and outputs the filtered signal. A delay register delays the signal passed through the adaptive filter for a predetermined period of time and outputs the delayed signal. A level detector determines a level value based on a plurality of delayed signals stored in the delay register and outputs a determined level value. A selecting unit outputs one of the plurality of delayed signals as a detected value based on the determined level value. An expected value storing unit outputs a predetermined expected value based on the determined level value. A comparing unit compares the detected value and the expected value and outputs a difference signal based on the comparison. A coefficient calculator calculates tap coefficients for the adaptive filter by applying a predetermined adaptive algorithm to the difference signal output from the comparing unit and the offset-canceled signal.

The second signal processor is preferably a 3T-correcting unit. In the 3T-correcting unit, a first register determines a sign of the selected signal at every detection clock, stores the results of the determination, and shifts stored values by 1 bit at the next detection clock. As described above, the selected signal is one of the offset-canceled signal and the equalized signal as selected by the switching unit. A second register stores an absolute value of the selected signal at every detection clock and shifts stored values to next storing locations at the next detection clock. A T-detecting circuit detects whether the selected signal is a 1T or a 2T signal using the values stored in the first and second registers. A first substituting circuit corrects the selected signal into a 3T signal if the selected signal is determined to be a 1T signal, by inverting the sign of signals at adjacent detection time points (i.e. previous and subsequent in time) from the 1T signal. A second substituting circuit corrects the selected signal into a 3T signal if the selected signal is determined to be a 2T signal, by comparing the absolute value of signals at the adjacent detection time points from the 2T signal and inverting the sign of the adjacent signal having a smaller absolute value than the absolute value of the other adjacent signal.

Preferably, in the 3T-correcting unit, a first register determines the sign of the offset-canceled signal at every detection clock, stores the result of the determination, and shifts stored values by 1 bit at the next detection clock. A second register stores the absolute value of the selected signal at every detection clock, and shifts the stored values to next storing locations at the next detection clock. A T-detecting circuit detects whether a portion of the selected signal is a 1T or a 2T signal using the values stored in the first and second registers. A first substituting circuit changes an amplitude of signals at adjacent detection time points from the portion of the selected signal to "1" and outputs the value of "1" if the portion of the selected signal is determined to be a 1T signal by the T-detecting circuit. A second substituting circuit compares an absolute value of signals at adjacent detection time points from the portion of the selected signal if the portion of the selected signal is determined to be a 2T signal by the T-detecting circuit, and changes the amplitude of the adjacent signal having the smaller absolute value than the other adjacent signal to 1, and outputs the value of "1". An operator performs an exclusive-OR-operation (XOR) on the output value of the first or second substituting circuit and the sign of the input signal for 3T-correction, i.e., the selected signal.

To achieve the above and other objects of the present invention, there is provided another embodiment of a selective disturbance compensating apparatus for reproduction from an optical recording medium for compensating for the disturbance of a signal read from the reproducing medium and converted into a digital signal. A direct current (DC) offset canceller cancels a DC offset from the digital signal and a first signal processor equalizes the offset-canceled signal. A first switching unit selects one of the offset-canceled signal and the equalized signal according to a comparison of a level of distortion caused by asymmetry of the offset-canceled signal with a predetermined reference level. A second signal processor corrects the asymmetry of the selected signal and outputs a first corrected result. A Viterbi decoder corrects the asymmetry of the equalized signal and outputs a second corrected result. A second switching unit selects one of the first and second corrected results to output an asymmetry corrected signal.

the present invention is also achieved by a 3T-correcting method of compensating for distortion caused by asymmetry of an input signal in reproduction from an optical recording medium, the method comprising: determining a sign of a signal at every detection time point; if an input signal is determined to be a 1T signal by the determination of the sign, correcting the 1T signal into a 3T signal by inverting the sign of signals at the adjacent detection time points from the 1T signal; and if an input signal is determined to be a 2T signal by the determination of the sign, correcting the 2T signal into a 3T signal by comparing the absolute value of signals at the adjacent detection time points from the 2T signal and inverting the sign of the adjacent signal having a smaller absolute value than the absolute value of the other adjacent signal.

BRIEF DESCRIPTION OF THE DRAWINGS

The above object and advantages of the present invention will become more apparent by describing in detail preferred embodiments thereof with reference to the attached drawings in which:

FIG. 4 shows examples of the operation of the level detector of FIG. 3;

DESCRIPTION OF THE PREFERRED EMBODIMENTS

Figure 1:
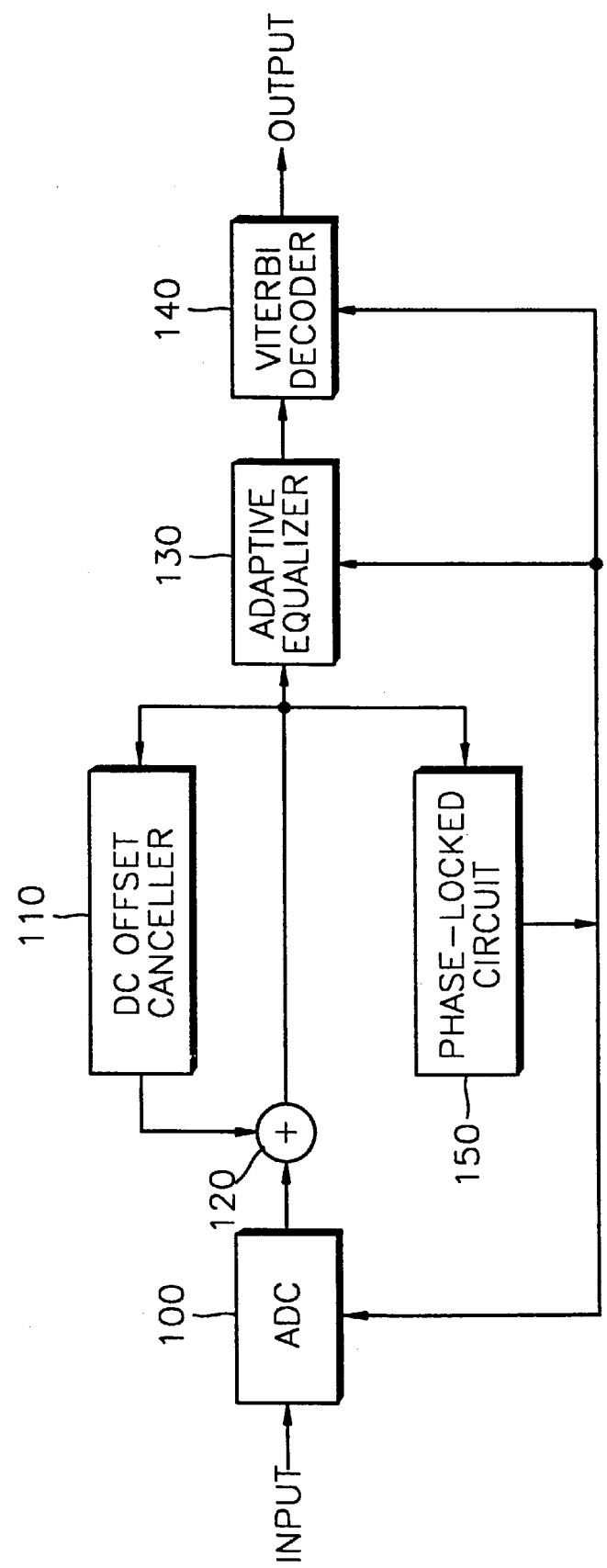
FIG. 1 shows an example of a conventional disturbance compensating apparatus for an optical recording medium.

Reference will now be made in detail to the present embodiments of the present invention, examples of which are illustrated in the accompanying drawings, wherein like reference numerals refer to like elements throughout.

Figure 2A:
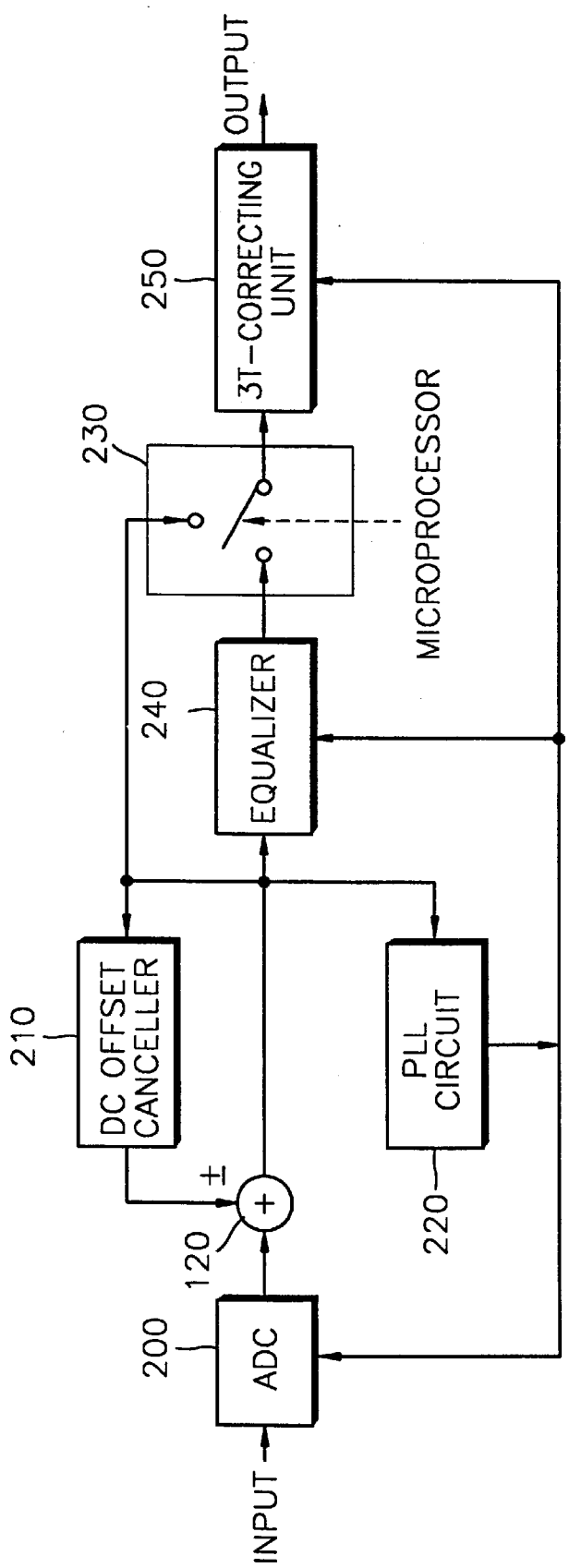
FIG. 2A is a block diagram of a preferred embodiment of a selective disturbance compensating apparatus used in reproduction from an optical recording medium according to the present invention.

An embodiment of a selective disturbance compensating apparatus for reproduction of a signal from an optical recording medium according to the present invention is shown in FIG. 2A. The selective disturbance compensating apparatus of FIG. 2A comprises an analog-to-digital converter (ADC) 200, a direct current (DC) offset canceller 210, a phase-locked loop (PLL) circuit 220, a switching unit 230, an equalizer 240, and a 3T-correcting unit 250. The ADC 200 converts an analog signal read from the optical recording medium to digital data with a predetermined sampling cycle. The DC offset canceller 210 provides a signal to an adder 120 to remove a DC offset included in the sampling data output from the ADC 200. The PLL circuit 220 generates clock signals for the selective disturbance compensating apparatus according to the present invention using digital data from which the offset is removed (the offset-canceled signal). Where distortion caused by an asymmetry component existing in the offset-canceled signal is above a predetermined reference value, the switching unit 230 switches the offset-canceled signal to directly enter the 3T-correcting unit 250. Where distortion caused by the asymmetry component is below the predetermined reference value, the switching unit 230 switches the offset-canceled signal which has passed through the equalizer 240 to enter the 3T-correcting unit 250. This signal selection is made because the distortion tends to become more serious where a reproduction signal from the optical recording medium including a serious asymmetry component passes through the equalizer 240. For this reason, the switching is performed so that the distortion caused by serious asymmetry is compensated for by directly passing the offset-canceled signal through the 3T-correcting unit 250, without passing the offset-canceled signal through the equalizer 240. The output of the equalizer 240 (equalized signal) is selected by the switching unit 230 where the signal distortion caused by asymmetry is below the predetermined reference value, to correct the signal distortion caused by tilt and to remove crosstalk from the signal. The offset-canceled signal is selected by the switching unit 230 where the distortion caused by asymmetry is above the predetermined reference value to 3T-correct the offset-canceled signal. Thus, the 3T-correcting unit 250 performs 3T-correction with respect to one of the offset-canceled signal and the equalized signal.

Figure 2B:
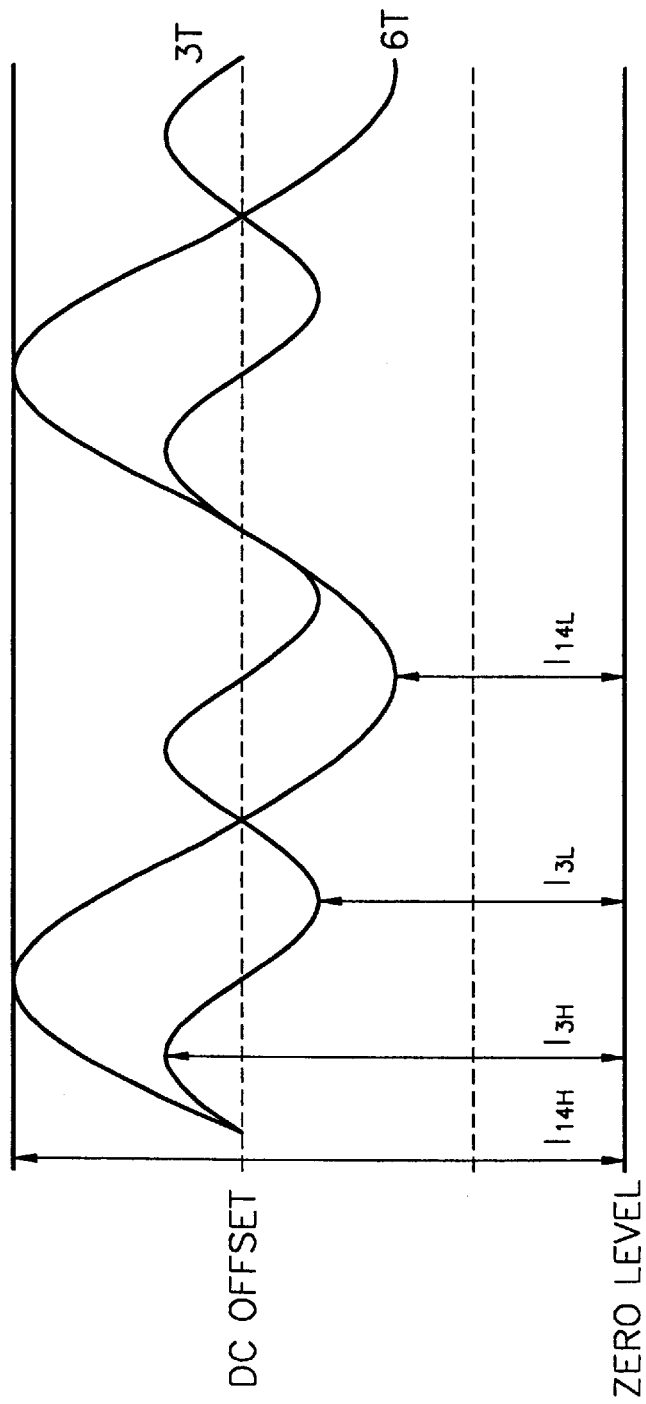
FIG. 2B shows an example of physical values which are used to derive a selection reference for the selective disturbance compensation by the apparatus of FIG. 2A.

The above-described "predetermined reference value" refers to a value within the range of ±10 to 15% of a resultant value calculated by:

$$\frac{(I_{14H} - I_{3H}) - (I_{3L} - I_{14L})}{2(I_{14H} - I_{14L})} \quad (1)$$

where $I_{14H}$ is an amplitude of a 14T signal from a zero level to a first maximum value, $I_{14L}$ is the amplitude of the 14T signal from the zero level to a first minimum value, $I_{3H}$ is an amplitude of a 3T signal from the zero level to a second maximum level, and $I_{3L}$ is the amplitude of the 3T signal from the zero level to a second minimum level. For understanding of expression (1) above, the 3T signal and a 6T signal, which has maximum and minimum values which are the same as those of the 14T signal, are shown in FIG. 2B.

Figure 3:
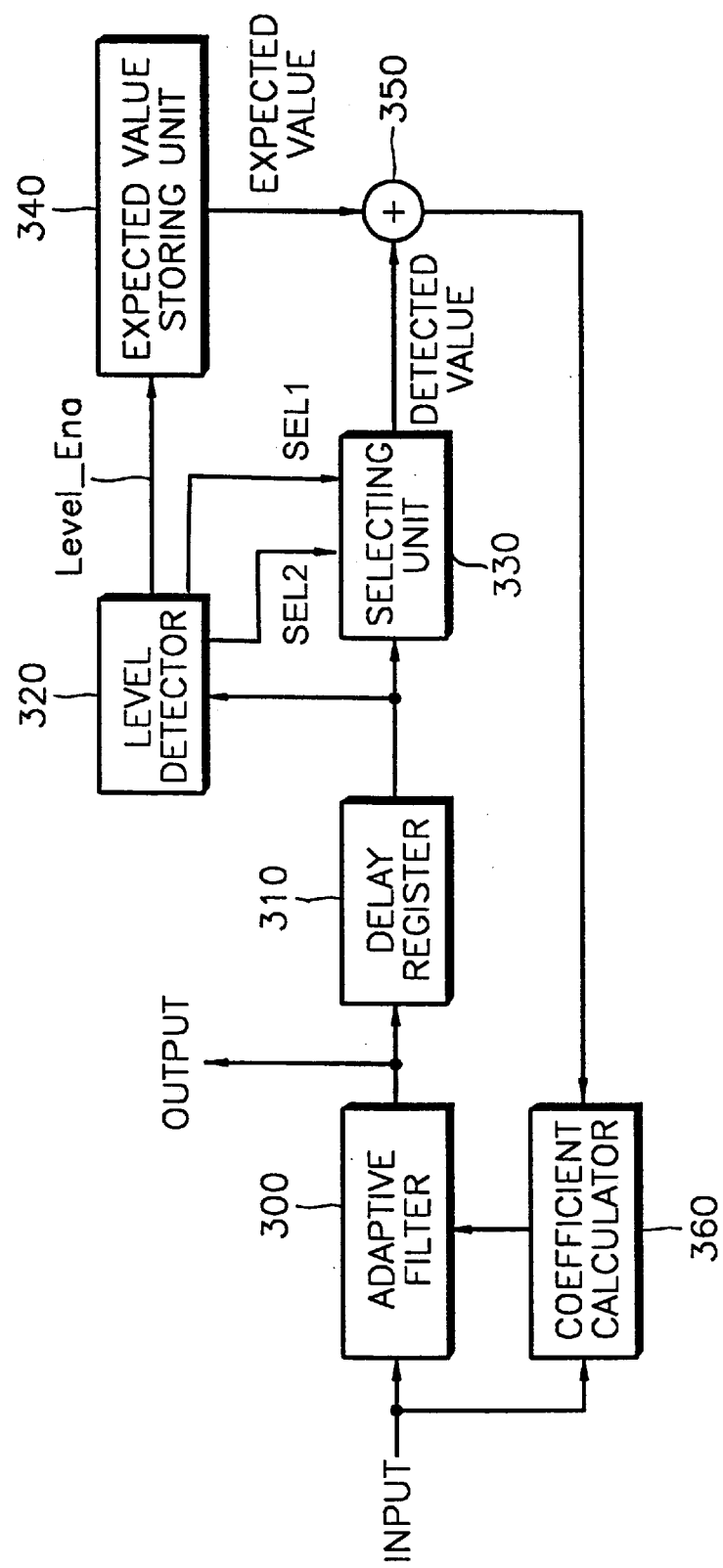
FIG. 3 is a detailed block diagram of the equalizer of FIG. 2A.

FIG. 3 is a detailed block diagram of the equalizer 240 of FIG. 2. The equalizer 240 comprises an adaptive filter 300, a delay register 310, a level detector 320, a selecting unit 330, an expected value storing unit 340, a comparing unit 350, and a coefficient calculator 360.

The adaptive filter 300 comprises gain-variable tap coefficients. The adaptive filter 300 filters the offset-canceled signal and outputs a filtered offset-canceled signal. The adaptive coefficients of the adaptive filter 300 are determined such that a difference (error) between a previously set expected value and the actual output value of the filtered offset-canceled signal output from the adaptive filter 300 converges toward zero.

The delay register 310 delays the filtered offset-canceled signal for a predetermined period of time, and outputs the delayed signal. Signal values $y_k(t+n-m)$ (where m=0, 1, 2, 3, . . . ) at predetermined detection time points are stored in the delay register 310.

The level detector 320 uses the signal values stored in the delay register 310, provides logical determination conditions, which are used in determining a signal level as one of middle levels (+mid level and −mid level), a zero level (0 level), and maximum levels (+max level and −max level), and outputs selection signals SEL1 and SEL2 corresponding to the conditions to the selecting unit 330. The level detector 320 also outputs a level signal Level_Ena corresponding to the selection signals SEL1 and SEL2 to the expected value storing unit 340.

FIG. 4 shows examples of conditions of operation of the level detector 320. The selecting unit 330 outputs a signal stored in the delay register 310 according to the selection signal output from the level detector 320 as a detected value. The expected value storing unit 340 outputs an expected value according to the level signal Level_Ena output from the level detector 320. The detected value and the level signal Level_Ena and corresponding values of SEL 1 and SEL 2 are determined logically by applying the mathematical and logic expressions indicated in FIG. 4, where the expressions $y_k[t+]$, $y_k[t+n-1]$ and $y_k[t+n-2]$ represent delayed outputs from the register 310 and Th represents a predetermined threshold value. For example, if the level signal Level_Ena is a positive middle level (+mid level), digital signal sampling is performed with 6 bits resolution, and the zero level is set to the $32^{nd}$ signal among the $0^{th}$ through $(2^6-1)^{th}$ signals, 60% of the maximum amplitude of the signal, which corresponds to the amplitude of the $49^{th}$ (=32+17) signal, is output as an expected middle level value. The expected value for each of the signal levels is predetermined depending on the number of sampling bits of the digital signal.

The comparing unit 350 compares the expected value output from the expected value storing unit 340 and the detected signal (actual signal value) output from the selecting unit 330, and outputs an error signal corresponding to the difference between the expected value and the detected value. The coefficient calculator 360 calculates a coefficient by which the error signal output from the comparing unit 350 is multiplied to give a product which converges to a predetermined value, and outputs the calculated coefficient to the adaptive filter 300. The adaptive filter 300 outputs a distortion compensated signal by filtering using the coefficient as a tap coefficient. An equalizer for compensating for a distortion component of a signal, which is caused by tilt, in this manner is disclosed in U.S. patent application Ser. No. 09/704,549 filed Nov. 3, 2000 and claiming priority based on Korean Patent Application No. 99-48585 filed Nov. 4, 1999 in the Korean Patent Office, and assigned to the assignee of the present invention, the disclosure of which is incorporated herein by reference.

Figure 5A:
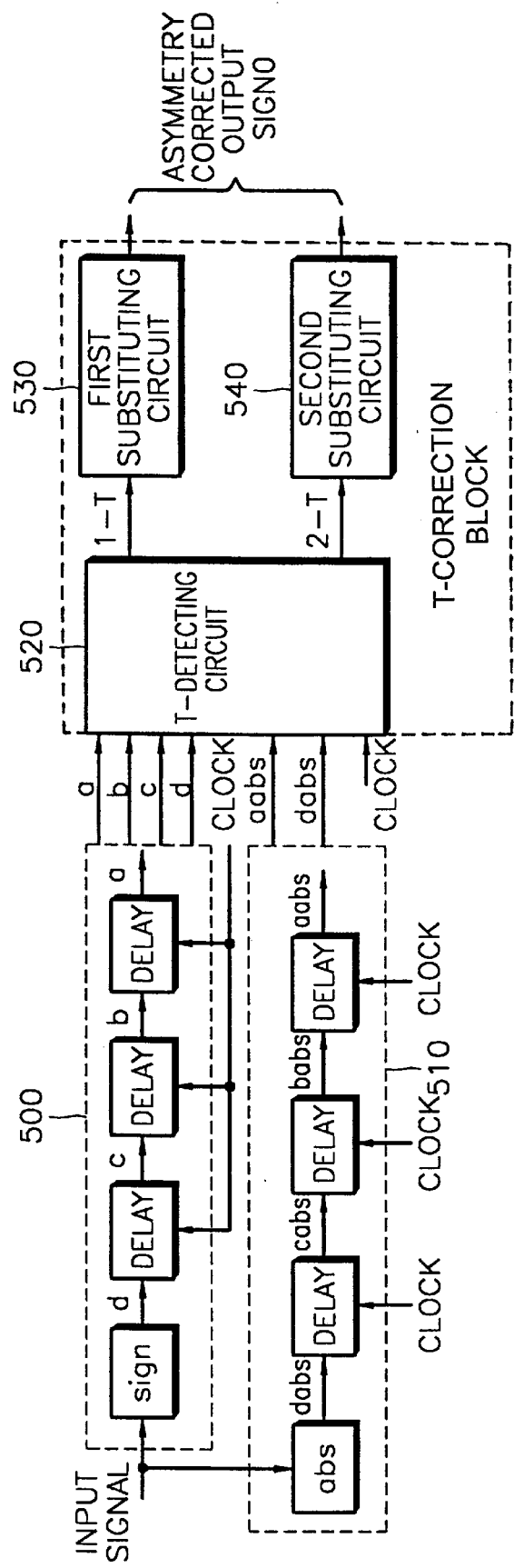
FIG. 5A is a detailed block diagram of the 3T-correcting unit of FIG. 2A.
Figures 6A, 6B, 6C:
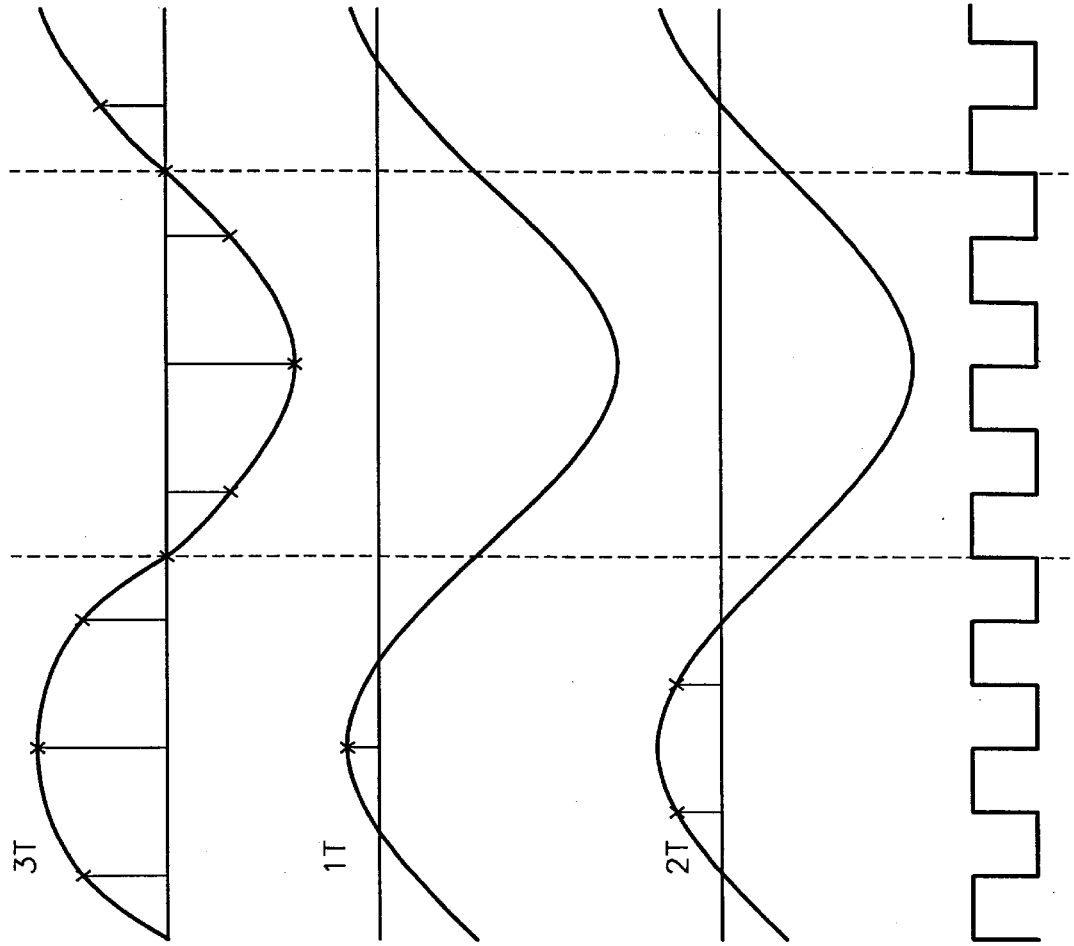
FIGS. 6A through 6C show 3T, 1T, and 2T signals, respectively, to describe asymmetry.
Figure 7A:
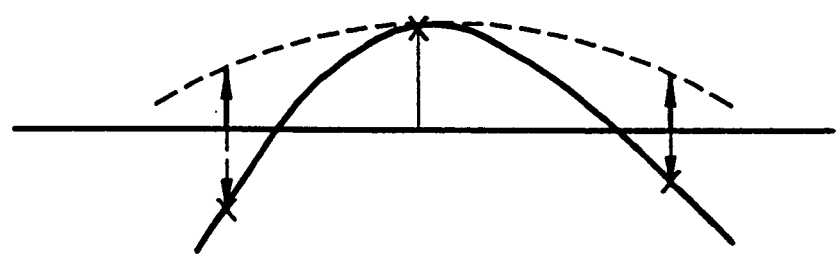
FIGS. 7A and 7B illustrate asymmetry correction for 1T and 2T signals, respectively.
Figure 7B:
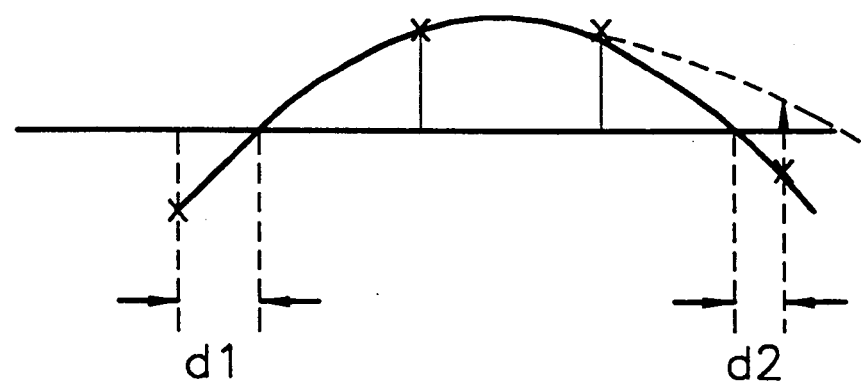

FIG. 5A is a detailed block diagram of the 3T-correcting unit 250 of FIG. 2A. The 3T-correcting unit 250 comprises a first register 500, a second register 510, a T-detecting circuit 520, a first substituting circuit 530, and a second substituting circuit 540.

Where there are three detection clock cycles in a half cycle of a reproduction signal and the reproduction signal is a normal signal having no asymmetry component, a sign of the reproduction signal remains constant for the three detection clock cycles and the reproduction signal is referred to as a "3T signal" (FIG. 6A). Where the reproduction signal has an asymmetry component, a 1T (FIG. 6B) signal or a 2T (FIG. 6C) signal is detected during the three detection clock cycles. A correction is necessary for the 1T signal and the 2T signal. For the 1T signal, the signs of two signals at the neighboring detection clocks from the 1T signal are inverted (see FIG. 7A). For the 2T signal, the absolute values of two signals at the neighboring detection clocks from the 2T signal are compared and the sign of the signal whose absolute value is smaller than the absolute value of the other signal is inverted (see FIG. 7B). This is the principle of 3T-correction.

As discussed above with reference to FIG. 2A, the switching unit 230 selects one of the offset-canceled signal output by the adder 120 and the equalized signal output by the equalizer 240. Referring now to FIG. 5A, the first register 500 determines and stores the sign of the selected signal ($k(t+n-m)$, where m=0, 1, 2, 3, . . . ) at every detection clock, and shifts the stored values by 1 bit at the next detection clock. For example, sign($y_k(t+n-3)$), sign($y_k(t+n-2)$), sign($y_k(t+n-1)$), and sign($y_k(t+n)$), which are designated by a, b, c and d, respectively, in FIG. 5A, are stored in order in the first register 500. The second register 510 stores the absolute value of the selected signal at every detection clock, and shifts the stored values to next storage locations at the next detection clock. For example, abs($y_k(t+n-3)$), abs($y_k(t+n-$ 2)), abs($y_k$(t+n−1)), and abs($y_k$(t+n)), which are designated by aabs, babs, cabs, and dabs, respectively, in FIG. 5A, are stored in order in the second register 510.

To make the determination of the sign of the selected signal easier, a mean value of two signals at successive detection time points is calculated and a sign of the mean value is determined and stored in the first register 500. Where this process is performed in the first register 500, the second register 510 stores an absolute value of the mean value of the two signals at the successive detection time points.

The T-detecting circuit 520 determines whether the selected signal is a 1T or 2T signal using the values stored in the first and second registers 500 and 510. If it is determined that the selected signal is a 1T signal, the T-detecting circuit 520 outputs the 1-T signal to the first substituting circuit 530 which corrects the 1T signal into a 3T signal by inverting the signs of the signals at the adjacent detection time points from the 1T signal. If it is determined that the selected signal is a 2T signal, the T-detecting circuit 520 outputs the 2-T signal to the second substituting circuit 540 which corrects the 2T signal into a 3T signal by comparing the absolute values of the signals at the adjacent detection time points from the 2T signal and inverting the sign of the adjacent signal having a smaller absolute value than the absolute value of the other adjacent signal.

Figure 5B:
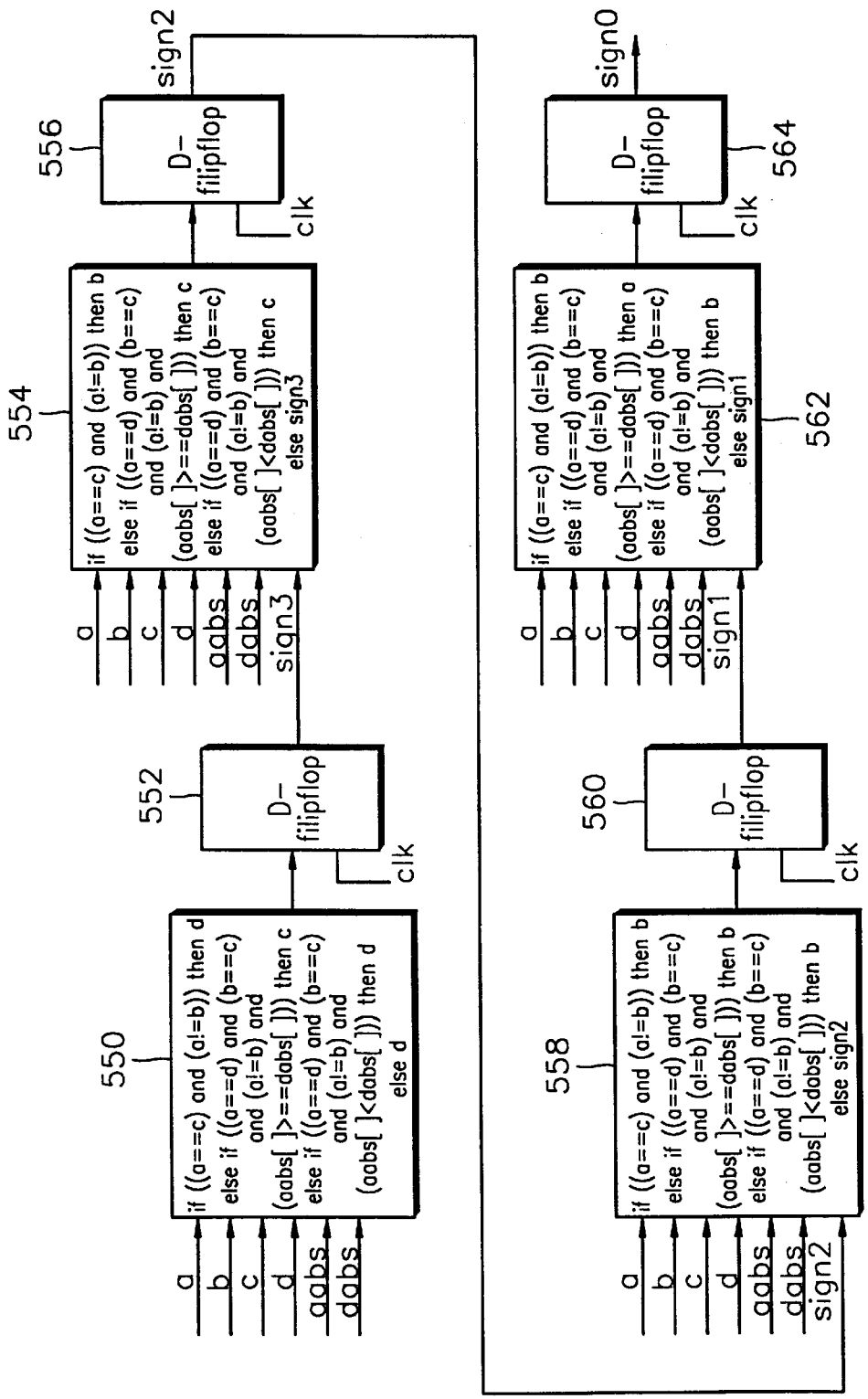
FIG. 5B is a detailed block diagram of the T-correction block of FIG. 5A.

A T-correction block by which the T-detecting circuit 520 and the first and second substituting circuits 530 and 540 are implemented is shown in FIG. 5B. The T-correction block of FIG. 5B provides the logical determination conditions which are used in determining whether a signal to be reproduced is a 1T or 2T signal using the values stored in the first and second registers 500 and 510, and performs a correction according to the result of the determination to output a final corrected value sign0. In FIG. 5B, notations of the form "a==c" have the same meaning as "a=c"; notations of the form "a!" have a meaning of "not a"; and notations of the form "aabs[]" have a meaning of "absolute value of a".

The following is a description of the T-correction block of FIG. 5B. The signals input to the first block 550 include signals a, b, c, d, aabs, and dabs. Signal d is the result sign value of delay of the input signal by a D-flip flop, which is included in the block labeled "sign" in FIG. 5A, and c, b, and a are the sign values delayed using the D-flip flop for signals d, c, and b. The signals aabs and dabs are the absolute values of the input values a and b, respectively. The 3T-correction function of the T-correction block of FIG. 5B will be described with reference to three cases; that is, where neither a 1T nor a 2T signal is input, where a 1T signal is input, and where a 2T signal is input.

Where a signal which is neither a 1T nor a 2T signal is input, the result for the IF condition from the first block 550 is d. The result d is delayed by a D flip-flop block 552, and input to a second block 554 along with other input signals. The result for the IF condition from the second block 554 becomes sign 3. The sign 3 is delayed by the D-flip-flop block 556 and input to a third block 558. The result for the IF condition from the third block 558 becomes sign2. The sign2 is delayed by a D-flip-flop block 560 and input to a fourth block 562 along with other input signals. The result for the IF condition from the fourth block 562 becomes sign1. The sign1 is delayed by a D-flip-flop 564. Here, sign3, which is the input value of the second block 554, is the output value of the first block 550, sign2, which is the input value of the third block 558, is the output value of the second block 554, and sign1, which is the input value of the fourth block 562, is the output value of the third block 558. Thus, the output value d of the first block 550 becomes the final output value sign1. In other words, where a signal that is neither 1T nor 2T signal is input, the input signal is output without a change in its sign.

For the second case where an input signal is detected as a 1T signal, assuming that the signal is input in the order of −8, −6, −4, −2, 2, −3, −5, and −7 at time t, the input signal value varies as follows.

[t = 0]
input signal: value of d = −8
output signal: d = −1.
[t = 1]
Input signal: value d = −6, value of c = −8
Output signal: d = −1, c = −1, dabs = 6.
[t = 2]
Input signal: value of d = −4, value of c = −6, value of b = −8
Output signal: d = −1, c = −1, b = −1, dabs = 4.
[t = 3]
Input signal: value of d = −2, value of c = −4, value of b = −6, value of a = −8
Output signal: d = −1, c = −1, b = −1, a = −1, dabs = 2, aabs = 8.

No condition is satisfied in the first block 550 and thus the first block 550 outputs d=−1.

[t = 4]
Input signal: value of d = 2, value of c = −2, value of b = −4, value of a = −6
Output signal: d = 1, c = −1, b = −1, a = −1, dabs = 2, aabs = 6, sign3 = −1.

No condition is satisfied in the first block 550 and thus the first block 550 outputs d=1.
No condition is satisfied in the second block 554 and thus the second block 554 outputs sign3=−1.

[t = 5]
Input signal: value of d = −3, value of c = 2, value of b = −2, value of a = −4.
Output signal: d = −1, c = 1, b = −1, a = −1, dabs = 3, aabs = 4, sign3 = 1, sign2 = −1.

No condition is satisfied in the first block 550 and thus the first block 550 outputs d=−1.
No condition is satisfied in the second block 554 and thus the second block 554 outputs sign3=1.
No condition is satisfied in the third block 558 and thus the third block 558 outputs sign2=−1.

[t = 6]
Input signal: value of d = −5, value of c = −3, value of b = 2, value of a = −2.
Output signal: d = −1, c = −1, b = 1, a = −1, dabs = 5, aabs = 2, sign3 = −1, sign2 = 1, sign1 = −1.

The IF condition is satisfied in the first block 550 and thus the first block 550 outputs d=−1.
The IF condition is satisfied in the second block 554 and thus the second block 554 outputs b=1.
The 1F condition is satisfied in the third block 558 and thus the third block 558 outputs b=1.

The IF condition is satisfied in the fourth block 562 and thus the fourth block 562 outputs b=1.

```
[t = 7]
Input signal:   value of d = −7, value of c = −5, value of b = −3,
                value of a = 2
Output signal:  d = −1, c = −1, b = −1, a = 1, dabs = 7, aabs = 2,
                sign4 = 1, sign3 = 1, sign2 = 1, sign1 = −1
```

No condition is satisfied in the first block 550 and thus the first block 550 outputs d=−1.

No condition is satisfied in the second block 554 and thus the second block 554 outputs sign3=1.

No condition is satisfied in the third block 558 and thus the third block 558 outputs sign2=1.

No condition is satisfied in the fourth block 562 and thus the fourth block 562 outputs sign1=1.

If there is no change in sign since t=8, no condition is satisfied for each of the blocks. Thus, there is no change in the output value from each of the blocks. At t=6, the IF condition of the first block 550 is satisfied and thus the sign of the output signal sign0 is changed as follows:

| Input signal | −8 | −6 | −4 | −2 | 2 | −3 | −5 | −7 |
|---|---|---|---|---|---|---|---|---|
| Sign of Input Signal | −1 | −1 | −1 | −1 | 1 | −1 | −1 | −1 |
| Output Signal | −1 | −1 | −1 | 1 | 1 | 1 | −1 | −1. |

Finally, the 1T signal is changed into the 3T signal by correction.

In a similar manner, where an input signal is detected as a 2T signal, the second and third IF statements of each of the blocks are satisfied and the sign of the corresponding signal is changed, so that the polarity of the output signal sign0 is changed. For example,

| Input signal | −8 | −6 | −4 | 2 | 2 | −3 | −5 | −7 |
|---|---|---|---|---|---|---|---|---|
| Sign of Input Signal | −1 | −1 | −1 | 1 | 1 | −1 | −1 | −1 |
| Output Signal | −1 | −1 | −1 | 1 | 1 | 1 | −1 | −1. |
| Input signal | −8 | −6 | −3 | 2 | 2 | −4 | −5 | −7 |
| Sign of Input Signal | −1 | −1 | −1 | 1 | 1 | −1 | −1 | −1 |
| Output Signal | −1 | −1 | 1 | 1 | 1 | −1 | −1 | −1. |

Finally, the 2T signal is changed into a 3T signal by correction.

Figure 8A:
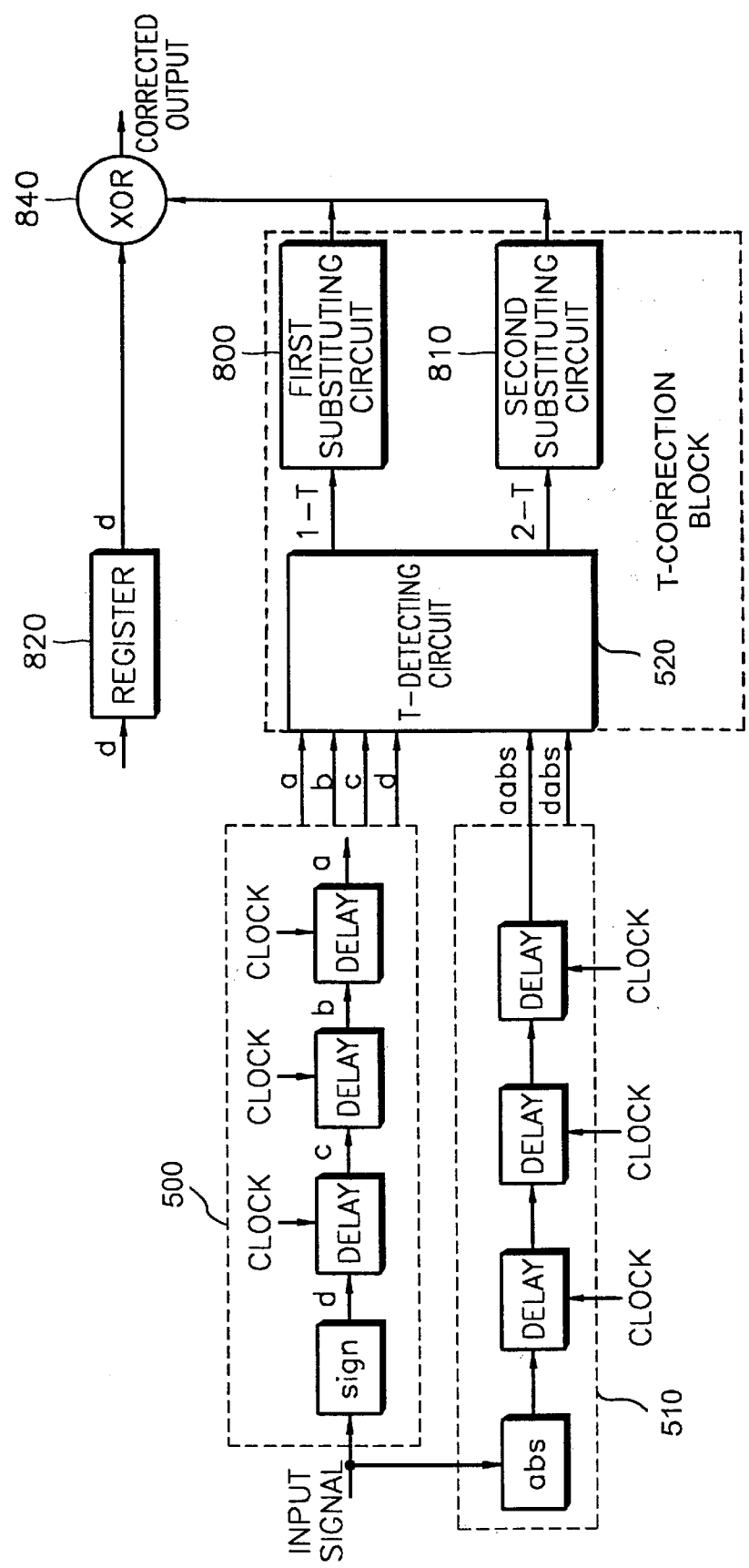
FIG. 8A shows another embodiment of the 3T-correcting unit of FIG. 2A.
Figure 8B:
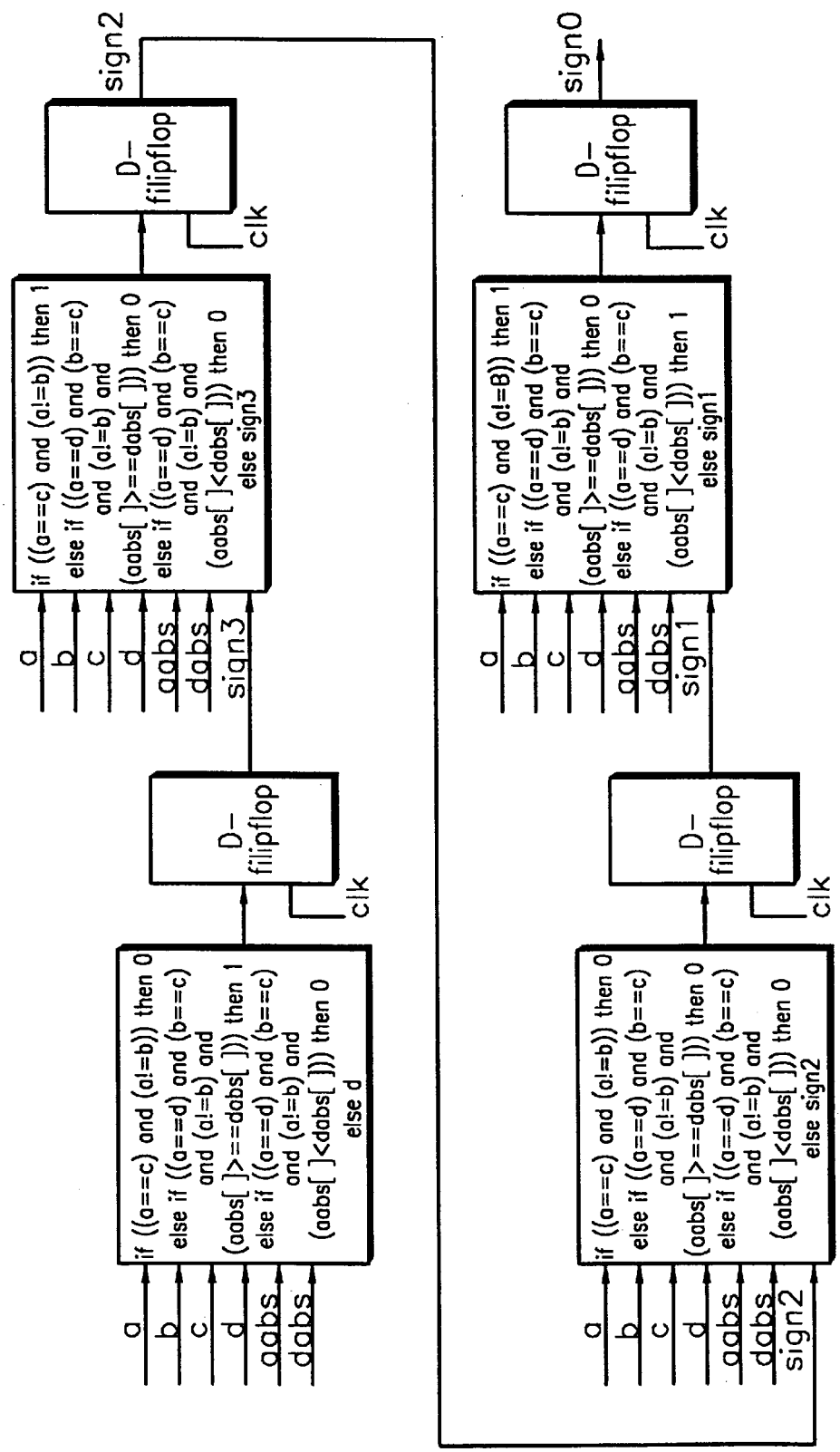
FIG. 8B is a detailed block diagram of the T-correcting block of FIG. 8A.

FIG. 8A is a block diagram of another embodiment of the 3T-correcting unit 250 of FIG. 2A. The 3T-correcting unit of FIG. 8A has a similar structure to that of FIG. 5A but differs from the 3T-correcting unit of FIG. 5A in the way in which T-correction is performed. The 3T-correcting unit of FIG. 8A comprises a first substituting circuit 800 for changing an amplitude of signals at adjacent detection time points from a 1T signal to 1 if the selected signal is determined to be a 1T signal, and outputting the value of 1; a second substituting circuit 810 for comparing the absolute values of the signals at the adjacent detection time points from a 2T signal if the selected signal is determined to be a 2T signal, changing the smaller absolute value to 1, and outputting the value of 1; and an operator 840 for exclusive-OR-operating (XOR) the output value of the first or second substituting circuit 800 or 820, and an output value of a register 820 which stores the sign of input signals for 3T-correction. FIG. 8B is a detailed block diagram of the T-correction block of FIG. 8A. The structure of FIG. 8B is the same as the structure of FIG. 5B. Operation of the T-correction block of FIG. 8B is similar to the operation of the of the T-correction block of FIG. 5B and differs in that results of intermediate logic are expressed in terms of "1" and "0" as described above instead of in terms of "b", "c" and "d" as described with respect to FIGS. 5A and 5B. In FIG. 8B, notations of the form "a==c" have the same meaning as "a=c"; notations of the form "a!" have a meaning of "not a"; and notations of the form "aabs[]" have a meaning of "absolute value of a".

Figure 9:
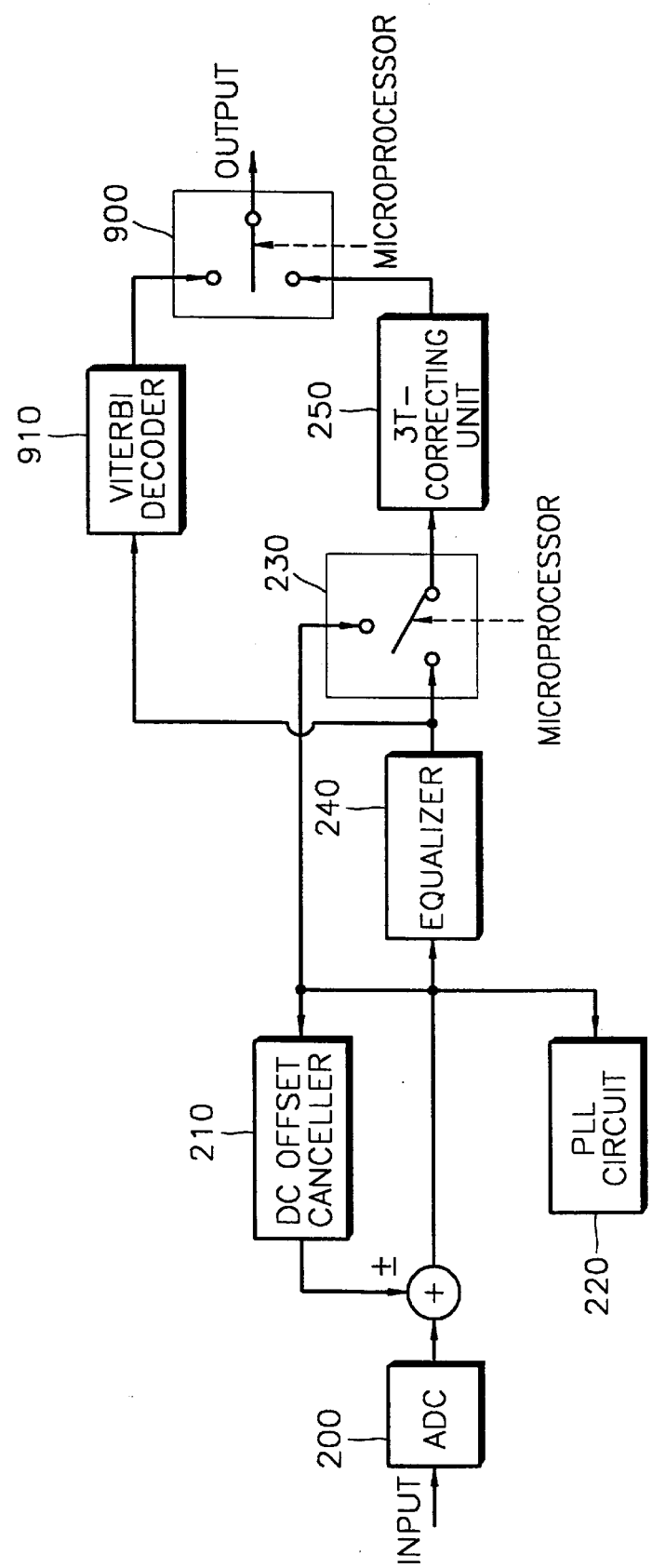
FIG. 9 is a block diagram of another embodiment of the selective disturbance compensating apparatus according to the present invention for use in reproduction from an optical recording medium.

FIG. 9 is a block diagram of another embodiment of a selective disturbance compensating apparatus according to the present invention for reproduction of a signal from an optical recording medium. The selective disturbance compensating apparatus of FIG. 9 comprises an ADC 200, a DC offset canceller 210, a PLL circuit 220, a switching unit 230, an equalizer 240, and a 3T-correcting unit 250. The operation and function of these elements are the same as described with reference to FIGS. 2A and 2 B. The selective disturbance compensating apparatus of FIG. 9 further comprises a second switching unit 900 and a Viterbi decoder 910. The selective disturbance compensating apparatus of FIG. 9 is characterized in that the second switching unit 900 selectively switches the Viterbi decoder 910 and 3T-correcting unit 250 for asymmetry compensation. Like the first switching unit, the second switching unit 900 is controlled by a microprocessor. The Viterbi decoder 910 is a circuit which detects and compensates for the least erroneous T value based on the statistical characteristic of the equalized signal.

Figure 10:
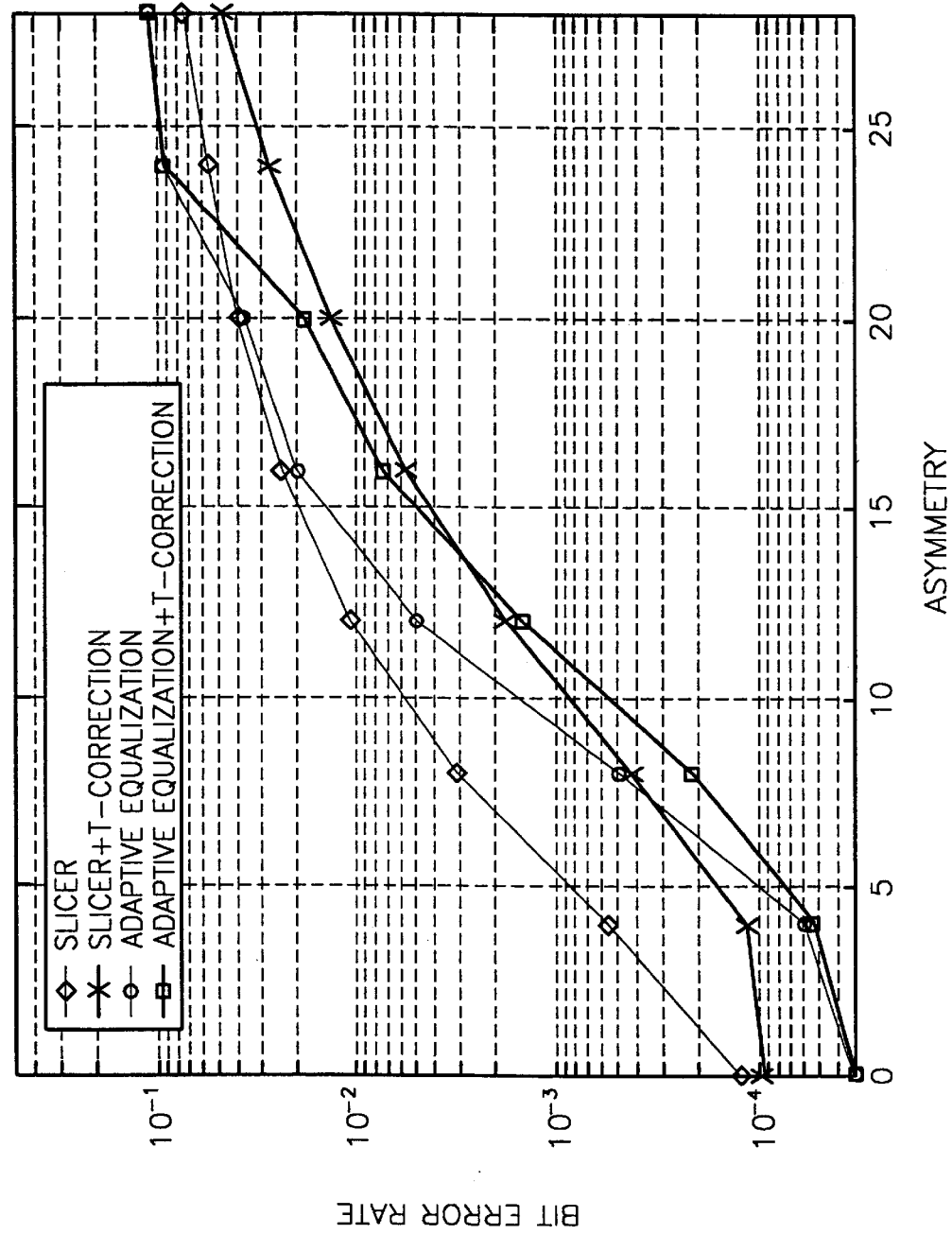
FIG. 10 is a graph comparatively showing the effects of tilt correction and 3T correction by a plurality of methods including the method according to the present invention.

FIG. 10 is a graph showing the effects of tilt correction and 3T-correction by a plurality of methods including the method according to the present invention. Where an asymmetry is 10–15% less than a predetermined reference level, and both the equalizer and 3T-correcting unit are used, the bit error rate is the lowest. In contrast, where the asymmetry is above the predetermined reference value, the error bit rate is lowest where only 3T-correction is performed without using the equalizer.

In summary, the selective disturbance correcting apparatus according to the present invention removes signal distortion caused by tilt and asymmetry using an equalizer and T-correcting unit. For only asymmetry compensation, only T-correction is selectively performed, thereby increasing signal reproduction efficiency.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A selective disturbance compensating apparatus for compensating for a disturbance of a signal read from an optical recording medium and converted into a digital signal, the apparatus comprising:

a direct current (DC) offset canceller which cancels a DC offset from the digital signal;

a first signal processor which equalizes the offset-cancelled signal;

a switching unit which selects one of the offset-canceled signal and the equalized signal according to a level of distortion caused by asymmetry of the offset-canceled signal; and a second signal processor which corrects the asymmetry of the selected signal, wherein the offset-canceled signal is selected where the level of distortion is above a predetermined reference level.

2. The selective disturbance compensating apparatus of claim 1, wherein the first signal processor compares a predetermined expected value of the equalized signal with an actual detected value of the equalized signal and compensates for a difference between the compared values so that the difference converges to zero.

3. The selective disturbance compensating apparatus of claim 1, wherein the first signal processor comprises:
   an adaptive filter which filters the offset-canceled signal with a variable tap coefficient filter and outputs the filtered signal;
   a delay register which delays the filtered signal for a predetermined period of time, stores a plurality of delayed signals corresponding to a plurality of time points and outputs the plurality of delayed signals;
   a level detector which determines a level value based on the plurality of stored signals and outputs the determined level value;
   a selecting unit which outputs one of the plurality of delayed signals as a detected value based on the determined level value;
   an expected value storing unit which outputs a predetermined expected value based on the determined level value;
   a comparing unit which compares the detected value and the expected value and outputs a difference signal based on the comparison; and
   a coefficient calculator which calculates tap coefficients for the adaptive filter by applying a predetermined adaptive algorithm to the difference signal and the digital signal.

4. The selective disturbance compensating apparatus of claim 1, wherein the second signal processor is a 3T-correcting unit.

5. The selective disturbance compensating apparatus of claim 4, wherein the 3T-correcting unit comprises:
   a first register which determines a sign of the selected signal at a plurality of detection clocks, stores results of the determinations, and shifts the stored sign values by 1 bit at a next detection clock;
   a second register which stores an absolute value of the selected signal at the plurality of detection clocks, and shifts the stored absolute values to next storing locations at the next detection clock;
   a T-detecting circuit which detects whether the selected signal is a 1T or a 2T signal based on the sign values and the absolute values stored in the first and second registers;
   a first substituting circuit which corrects the selected signal into a 3T signal if the selected signal is determined to be a 1T signal, by inverting the sign of signals at detection time points adjacent the time point of the 1T signal; and
   a second substituting circuit which corrects the selected signal into a 3T signal if the selected signal is determined to be a 2T signal, by comparing absolute values of signals at detection time points adjacent the time point of the 2T signal and inverting the sign of the adjacent signal having a smaller absolute value than the absolute value of the other adjacent signal.

6. The selective disturbance compensating apparatus of claim 4, wherein, in determining the sign of the selected signal, the first register calculates a mean value of two signals at successive detection clocks and determines the sign of the mean value, and the second register stores the mean value.

7. The selective disturbance compensating apparatus of claim 4, wherein the 3T-correcting unit comprises:
   a first register which determines a sign of the selected signal, stores a result of the determination, and shifts stored sign values by 1 bit at the next detection clock;
   a second register which stores an absolute value of the selected signal at every detection clock, and shifts the stored absolute values to next storing locations at the next detection clock;
   a T-detecting circuit which detects whether the selected signal is a 1T or a 2T signal based on the sign and absolute values stored in the first and second registers;
   a first substituting circuit which changes amplitudes of signals at adjacent detection time points of the selected signal to 1 and outputs the value of 1 if the input signal is determined to be a 1T signal;
   a second substituting circuit which compares absolute values of signals at adjacent detection time points from the selected signal if the input signal is determined to be a 2T signal, changes the amplitude of the adjacent signal having a smaller absolute value than the other adjacent signal to 1, and outputting the value of 1; and
   an operator for exclusive-OR-operating (XOR) the output value of the first or second substituting circuit and the sign of the selected signal for 3T-correction.

8. The selective disturbance compensating apparatus of claim 1, wherein the switching unit is implemented with a microprocessor.

9. The selective disturbance compensating apparatus of claim 1, wherein the predetermined reference value is a value within the range of ±10 to 15% of a resultant value calculated by the expression:

$$\frac{(I_{14H} - I_{3H}) - (I_{3L} - I_{14L})}{2(I_{14H} - I_{14L})}$$

where $I_{14H}$ is an amplitude of a 14T signal from a zero level to a first maximum value, $I_{14L}$ is the amplitude of the 14T signal from the zero level to a first minimum value, $I_{3H}$ is an amplitude of a 3T signal from a zero level to a second maximum level, and $I_{3L}$ is the amplitude of the 3T signal from the zero level to a second minimum level.

10. A selective disturbance compensating apparatus for compensating for a disturbance of a signal read from an optical reproducing medium and converted into a digital signal, the apparatus comprising:
   a direct current (DC) offset canceller which cancels a DC offset from the digital signal;
   a first signal processor which equalizes the offset-canceled signal;
   a first switching unit which selects one of the offset-canceled signal and the equalized signal according to a comparison of a level of distortion caused by asymmetry of the offset-canceled signal with a predetermined reference level;
   a second signal processor which corrects the asymmetry of the selected signal to output a first corrected result;
   a Viterbi decoder which corrects the asymmetry of the equalized signal to output a second corrected result; and
   a second switching unit which selects one of the first and second corrected results.

11. The selective disturbance compensating apparatus of claim 10, wherein the first signal processor compares a predetermined expected value of the equalized signal with an actual detected value of the equalized signal and compensates for a difference between the compared values so that the difference converges to zero.

12. The selective disturbance compensating apparatus of claim 10, wherein the first signal processor comprises:
- an adaptive filter which filters the offset-canceled signal with a variable tap coefficient and outputs the filtered signal;
- a delay register which delays the filtered signal for a predetermined period of time, stores signal values at a plurality of time points and outputs the delayed signal;
- a level detector which determines a level value based on the plurality of stored signals and outputs the determined level value;
- a selecting unit which outputs one of the plurality of delayed signals as a detected value based on the determined level value;
- an expected value storing unit which outputs a predetermined expected value based on the determined level value;
- a comparing unit which compares the detected value and the expected value and outputs a difference signal based on the comparison; and
- a coefficient calculator which calculates tap coefficients for the adaptive filter by applying a predetermined adaptive algorithm to the difference signal and the digital signal.

13. The selective disturbance compensating apparatus of claim 10, wherein the second signal processor is a 3T-correcting unit, and comprises:
- a first register which determines a sign of the selected signal at a plurality of detection clocks, stores results of the determinations, and shifts the stored sign values by 1 bit at a next detection clock;
- a second register which stores an absolute value of the selected signal at a plurality of detection clocks, and shifts the stored absolute values to next storing locations at the next detection clock;
- a T-detecting circuit which detects whether the selected signal is a 1T or a 2T signal based on the sign values and the absolute values stored in the first and second registers;
- a first substituting circuit which corrects the selected signal into a 3T signal if the selected signal is determined to be a 1T signal, by inverting the sign of signals at detection time points adjacent the time point of the 1T signal; and
- a second substituting circuit which corrects the selected signal into a 3T signal if the selected signal is determined to be a 2T signal, by comparing absolute values of signals at detection time points adjacent the time point of the 2T signal and inverting the sign of the adjacent signal having a smaller absolute value than the absolute value of the other adjacent signal.

14. The selective disturbance compensating apparatus of claim 13, wherein, in determining the sign of the selected signal, the first register calculates a mean value of two signals at successive detection clocks and determines the sign of the mean value, and the second register stores the mean value.

15. The selective disturbance compensating apparatus of claim 10, wherein the second signal processor is a 3T-correcting unit, and comprises:
- a first register which determines a sign of the selected signal, stores a result of the determination, and shifts stored sign values by 1 bit at the next detection clock;
- a second register which stores an absolute value of the selected signal at every detection clock, and shifts the stored absolute values to next storing locations at the next detection clock;
- a T-detecting circuit which detects whether the selected signal is a 1T or a 2T signal based on the sign and absolute values stored in the first and second registers;
- a first substituting circuit which changes amplitudes of signals at adjacent detection time points of the selected signal to 1 and outputs the value of 1 if the input signal is determined to be a 1T signal;
- a second substituting circuit which compares absolute values of signals at adjacent detection time points from the selected signal if the input signal is determined to be a 2T signal, changes the amplitude of the adjacent signal having a smaller absolute value than the other adjacent signal to 1, and outputting the value of 1; and
- an operator for exclusive-OR-operating (XOR) the output value of the first or second substituting circuit and the sign of the selected signal for 3T-correction.

16. The selective disturbance compensating apparatus of claim 10, wherein the first and second switching units are implemented with a microprocessor.

17. The selective disturbance compensating apparatus of claim 10, wherein the predetermined reference value is a value within the range of ±10 to 15% of the resultant value calculated by the expression:

$$\frac{(I_{14H} - I_{3H}) - (I_{3L} - I_{14L})}{2(I_{14H} - I_{14L})}$$

where $I_{14H}$ is an amplitude of a 14T signal from a zero level to a first maximum value, $I_{14L}$ is the amplitude of the 14T signal from the zero level to a first minimum value, $I_{3H}$ is an amplitude of a 3T signal from a zero level to a second maximum level, and $I_{3L}$ is the amplitude of the 3T signal from the zero level to a second minimum level.

18. A 3T-correcting method for compensating for distortion caused by asymmetry of an input signal in reproduction from an optical recording medium, the method comprising:
- determining a sign of the input signal at a plurality of time points;
- determining if the input signal is a 1T or a 2T signal based on the sign of the input signal at the plurality of time points;
- if the input signal is determined to be a 1T signal, correcting the 1T signal into a 3T signal by inverting the sign of the input signal at detection time points adjacent the time point of the 1T signal; and
- if the input signal is determined to be a 2T signal, correcting the 2T signal into a 3T signal by comparing the absolute value of signals at the adjacent detection time points from the 2T signal and inverting the sign of the adjacent signal having a smaller absolute value than the absolute value of the other adjacent signal.

19. A method of correcting a digital signal reproduced from an optical recording medium, the method comprising:
- canceling a direct current (DC) offset in the digital signal;
- determining a level of distortion in the offset-canceled signal caused by asymmetry of the offset-canceled signal;
- selectively processing the offset-canceled signal based on a comparison of the level of distortion of the offset-canceled signal with a predetermined reference value.

20. The method of claim 19, wherein the predetermined reference value is determined by ±k(A−B)/C where A is an average of maximum and minimum amplitudes of the offset-corrected signal determined with respect to a first number of clocks, B is an average of maximum and minimum amplitudes of the offset-corrected signal determined with respect to a second number of clocks, C is a difference between the maximum and minimum amplitudes determined with respect to the first number of clocks, and k is a constant, and wherein a ratio of the first number of clocks to the second number of clocks is at least two.

21. The method of claim 20, wherein the selective processing comprises:
   3-T correcting the offset-corrected signal where the level of distortion is greater than the predetermined value;
   equalizing the offset-corrected signal and 3-T correcting the equalized signal, if the level of distortion is not greater than the predetermined value; and
   equalizing the offset-corrected signal and Viterbi decoding the equalized signal if the level of distortion is not greater than the predetermined value and a predetermined amount of 3T error.

22. The method of claim 20, wherein the selective processing comprises:
   3-T correcting the offset-corrected signal where the level of distortion is greater than the predetermined value.

23. The method of claim 20, wherein the selective processing comprises:
   equalizing the offset-corrected signal; and
   3-T correcting the equalized signal, where the level of distortion is not greater than the predetermined value.

24. The method of claim 20, wherein the selective processing comprises:
   equalizing the offset-corrected signal where the level of distortion is not greater than the predetermined value; and
   Viterbi decoding the equalized signal where the level of distortion is not greater than the predetermined value and a predetermined amount of 3T error.

25. The method of claim 20, wherein the ratio of the first number of clocks to the second number of clocks is at least four.

26. The method of claim 20, wherein k has a value included in the range of 0.10 to 0.15.

* * * * *